Patented Jan. 29, 1952

2,583,551

UNITED STATES PATENT OFFICE 2,583,551

METHINE DYESTUFFS

Joseph B. Dickey, Rochester, N. Y., and George J. Taylor, Kingsport, Tenn., assignors to Eastman Kodak Company, Rochester, N. Y., a corporation of New Jersey No Drawing. Application May 4, 1950, Serial No. 160,105

6 Claims. (Cl. 260—465)

This invention relates to new methine compounds and their application to the art of dyeing or coloring.

We have discovered that the new methine compounds having the general formula:

I

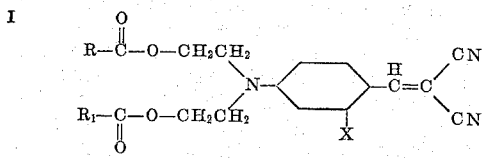

wherein R and $R_1$ each represents a methyl group, an ethyl group, a propyl group, a $$CH_3-O-CH_2-$$

group or a $CH_3CH_2-O-CH_2-$ group and X represents a hydrogen atom or a methyl group are very valuable dyes for coloring textile materials made of or containing a cellulose carboxylic acid ester having two to four carbon atoms in the acid groups thereof. These dye compounds when applied to the aforesaid textile materials give greenish-yellow dyeings which are fast to gas and which have exceptional fastness to light. Additionally, the dye compounds possess good sublimation properties and have good affinity for the aforesaid textile materials. Those compounds wherein X is a methyl group absorb at a longer wave length than those wherein X is a hydrogen atom and therefore are more orange-yellow. Due to the widespread use of cellulose acetate textile materials, the new methine compounds are presently primarily of importance in connection with the coloration of such materials.

It is an object of our invention to provide new methine dye compounds. Another object is to provide a satisfactory process for the preparation of the new methine dye compounds. A further object is to provide dyed cellulose alkyl carboxylic acid ester textile materials which are fast to gas and which possess unusually good fastness to light.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new methine dye compounds of our invention are prepared by reacting a methine compound having the formula:

II

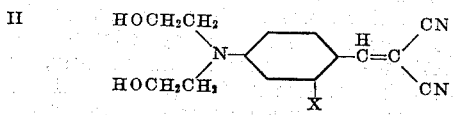

wherein X represents a hydrogen atom or a methyl group with an appropriate acylating agent or agents. Suitable acylating agents include acetic anhydride, propionic anhydride, n-butyric anhydride, β-methoxyacetic anhydride and β-ethoxyacetic anhydride.

Where R and $R_1$ represent the same group, the acylation reaction is conveniently carried out by heating a compound having the formula numbered II at a temperature of about 75° C. with an excess of the anhydride acylating agent. In this case the anhydride serves both as a solvent and an acylating agent. The acylation reaction can be carried out at higher and lower temperatures than that stated. Other than selecting a temperature sufficiently high to cause reaction but not high enough to cause decomposition there appears to be nothing critical about the reaction temperature. Temperatures of 60° C.–80° C., for example, are suitable. These temperatures, however, do not represent limits. If desired, an inert solvent or diluent such as pyridine, benzene, dioxane, isopropyl ether or ethyl acetate, for example, can be employed in the acylation reaction.

Where R and $R_1$ represent different groups the p-(di-β-hydroxyethylamino)-benzylidenemalonitrile compound having the formula numbered II is reacted with exactly one mol equivalent of an appropriate anhydride and then with at least one mol equivalent of a second anhydride. Where R and $R_1$ are to be different groups care should be taken not to add the first acylating agent faster than it is being reacted as otherwise there will be a tendency for both hydroxyl groups of the benzylidenemalonitrile to undergo reaction resulting in the formation of a compound wherein R and $R_1$ are the same group. A temperature of about 65° C. has been found appropriate for the preparation of these unsymmetrical methine compounds. However, as will be understood, higher or lower temperatures can be employed. Temperatures of 60° C.–80° C., for example, are suitable. High temperatures should be avoided during the first stage of the acylation reaction because of the increased tendency of both hydroxyl groups to undergo reaction at higher temperatures. The reaction is ordinarily run in the presence of an inert solvent or diluent such, for example, as those mentioned in the preceding paragraph.

We are aware that methine compounds are not broadly new. U. S. Patent 2,206,108 issued July 2, 1940 to Müller and Berres, for example, discloses dyestuffs of the general formula:

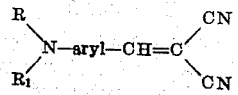

wherein R represents an alkyl group or a hydroxyalkyl group, R₁ represents a hydrogen atom, a hydroxyalkyl group, an alkoxyalkyl group, an aralkyl group or an aryl group, and the group

stands in para-position to CH, yielding in general clear shades on cellulose acetate silk. However, while these dyestuffs are disclosed as dyes for cellulose acetate and while certain of them are specifically stated to yield dyeings on cellulose acetate which have good fastness properties, they do not yield dyeings on cellulose acetate which are as fast to light as those obtained with the dye compounds of this invention. In general, the light fastness of the cellulose acetate dyeings obtained with the present dyestuffs is of the order of two or more times that obtained with the dyestuffs of U. S. Patent 2,206,108. To illustrate, the dyeings obtained on cellulose acetate with each of the dyes disclosed in Examples 1 and 2 are of the order of 4 to 5 times as fast as the corresponding unacylated dyestuff (i. e., the dyestuff wherein R and R₁ of the patent is β-hydroxyethyl and aryl is phenyl).

Further, while there are a considerable number of other prior art references disclosing methine dyestuffs which are stated to be dyes for cellulose acetate, so far as applicants are aware none of these references either disclose the present dyestuffs or dyestuffs which yield dyeings of comparable light fastness on cellulose acetate textile materials. The outstanding light fastness of the cellulose acetate dyeings obtained with applicants' dyes was not predictable.

The following examples illustrate the compounds of our invention and the manner in which they can be prepared.

*Example 1*

10 grams of p-(di-β-hydroxyethylamino)-benzylidenemalonitrile having the formula

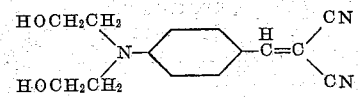

were added with stirring to 39 grams of acetic anhydride and the reaction mixture was heated, with stirring, at 75° C. for 3 hours. Then 32 grams of a mixture of acetic acid and acetic anhydride were distilled off under a pressure of 3 mm. and a temperature of 40° C.-45° C. The desired dye compound separated as a solid and was recovered by filtration on a Büchner funnel. It was washed with 50 grams of petroleum ether (B. P. 30° C.-65° C.) and then dried at 40° C. About 12 grams of p-(di-β-hydroxyethylamino)-benzylidenemalonitrile diacetate,

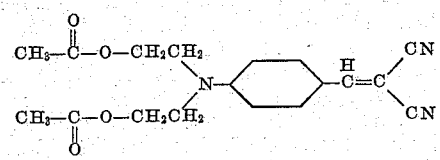

melting at 88° C.-89° C. were obtained.

*Example 2*

10 grams of p-(di-β-hydroxyethylamino)-benzylidenemalonitrile were added with stirring to 50 grams of propionic anhydride (commercial) and the reaction mixture resulting was heated, with stirring, at 75° C. for 3 hours. Then 40 grams of propionic anhydride and propionic acid were distilled off under a pressure of 3 mm. and a temperature of 40° C.-45° C. The desired dye compound separated as a solid and was recovered by filtration on a Büchner funnel. It was washed with 50 grams of petroleum ether (B. P. 30° C.-65° C.) and then dried at 40° C. 13.35 grams of p-(di-β-hydroxyethylamino)-benzylidenemalonitrile dipropionate,

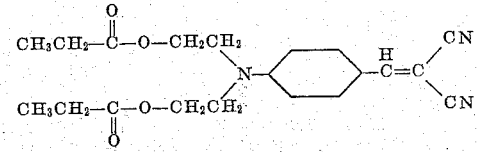

melting at 59° C.-62° C. were obtained.

*Example 3*

10 grams of p-(di-β-hydroxyethylamino)-benzylidenemalonitrile were added with stirring to 62.5 grams of β-methoxyacetic anhydride and the reaction mixture was heated, with stirring, at 75° C. for 3 hours. Then 32 grams of a mixture of β-methoxyacetic acid and β-methoxyacetic anhydride were distilled off under a pressure of 3 mm. and a temperature of 40° C.-45° C. The desired dye compound separated as a solid and was recovered by filtration on a Büchner funnel. It was washed with 50 grams of petroleum ether (B. P. 30° C.-65° C.) and then dried at 40° C. About 13 grams of p-(di-β-hydroxyethylamino)-benzylidenemalonitrile di-β-methoxyacetate,

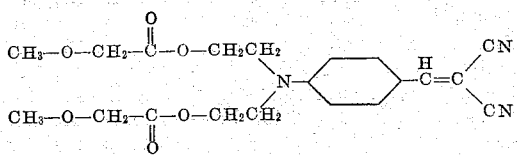

melting at 58° C. were obtained.

*Example 4*

10 grams of p-(di-β-hydroxyethylamino)-benzylidenemalonitrile were dissolved in 50 cc. of pyridine and exactly one mol equivalent (3.97 grams) of acetic anhydride was added over a period of 1 hour at 65° C. Then exactly one mol equivalent (5.06 grams) of propionic anhydride was added over a period of 1 hour at 65° C. and the reaction mixture was heated for 1 hour more at 65° C. The pyridine was distilled off under reduced pressure. The desired dye compound separated as a solid and was recovered by filtration on a Büchner funnel. It was washed with 50 grams of petroleum ether (B. P. 30° C.-65° C.) and then dried at 40° C. A good yield of

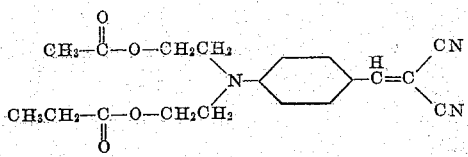

was obtained. It melts at 73° C.-74° C.

*Example 5*

9 grams of p-(di-β-hydroxyethylamino)-o-methylbenzylidenemalonitrile were added with stirring to 20 cc. of propionic anhydride and the reaction mixture was heated, with stirring, at 76° C. for 3 hours. Then the excess propionic anhydride and propionic acid were distilled off under reduced pressure. The dye compound formed was stirred with 100 cc. of cold petroleum ether, crystallized therefrom and recovered by filtration. It has the formula:

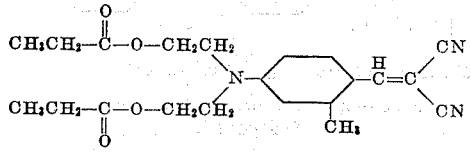

and melts at 70° C.–72° C.

Example 6

By the use of 61 grams of n-butyric anhydride in place of acetic anhydride in Example 1 a good yield of p-(di-β-hydroxyethylamino)-benzylidenemalonitrile di-(n-butyrate)

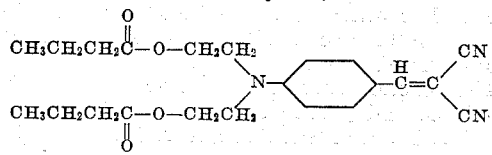

melting at 45° C.–46° C. is obtained.

Example 7

9 grams of p-(di-β-hydroxyethylamino)-o-methylbenzylidenemalonitrile,

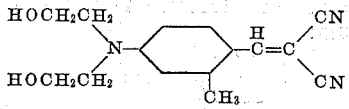

were added with stirring to 20 cc. of acetic anhydride and the reaction mixture was heated, with stirring, at 76° C. for 3 hours. Then the excess acetic anhydride and acetic acid were distilled off under reduced pressure. The dye compound formed was stirred with 100 cc. of cold petroleum ether, crystallized therefrom and recovered by filtration. It has the formula:

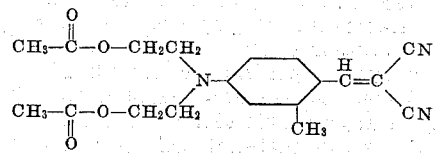

and melts at 98° C.–100° C.

Example 8

By the use of 61 grams of butyric anhydride and 10.54 grams of p-(di-β-hydroxyethylamino)-o-methylbenzylidenemalonitrile, in place of acetic anhydride and p-(di-β-hydroxyethylamino)-benzylidenemalonitrile, respectively, in Example 1 a good yield of

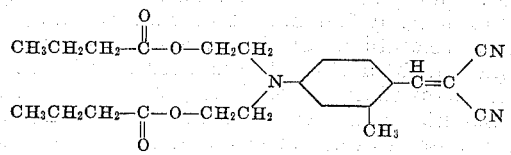

is obtained.

Example 9

By the use of 6.15 grams of n-butyric anhydride in place of propionic anhydride in Example 4

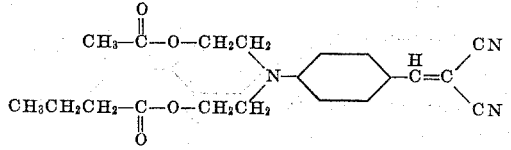

is obtained.

Example 10

10 grams of p-(di-β-hydroxyethylamino)-benzylidenemalonitrile were added with stirring to 73.3 grams of β-ethoxyacetic anhydride and the reaction mixture was heated, with stirring, at 75° C. for 3 hours. Then the β-ethoxyacetic acid formed in the reaction and the unreacted β-ethoxyacetic anhydride were distilled off under a pressure of 3 mm. The desired dye compound separated as a solid and was recovered by filtration on a Büchner funnel. It was washed with 50 grams of petroleum ether (B. P. 30°–65° C.) and then dried at 40° C. A good yield of p-(di-β-hydroxyethylamino)-benzylidenemalonitrile di-β-ethoxyacetate having the formula:

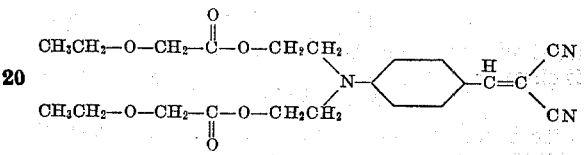

Example 11

By the use of 10.5 grams of p-(di-β-hydroxyethylamino)-o-methylbenzylidenemalonitrile in place of p-(di-β-hydroxyethylamino)-benzylidenemalonitrile in Example 3

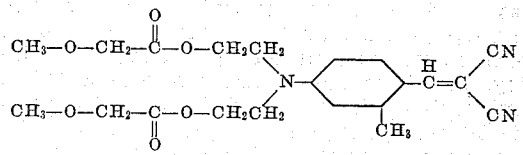

is obtained.

Example 12

By the use of 10.5 grams of p-(di-β-hydroxyethylamino)-o-methylbenzylidenemalonitrile in place of p-(di-β-hydroxyethylamino)-benzylidenemalonitrile in Example 10 the dye compound p-(di-β-hydroxyethylamino)-o-methylbenzylidenemalonitrile di-β-ethoxyacetate is obtained.

Example 13

By the use of 10.52 grams of p-(di-β-hydroxyethylamino)-o-methylbenzylidenemalonitrile in place of p-(di-β-hydroxyethylamino)-benzylidenemalonitrile in Example 4

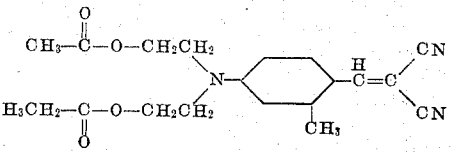

is obtained.

In order that the preparation of the compounds of our invention may be entirely clear, the preparation of the starting compounds used in their manufacture is disclosed hereinafter.

Example 14

22 grams of p-(di-β-hydroxyethylamino)-benzalaniline-m-sulfonic acid, 4 grams of malonitrile and 2.55 grams of sodium bicarbonate were added to 300 cc. of 50% aqueous methanol (commercial) in a 1-liter flask equipped with a stirrer and a reflux condenser and the reaction mixture was refluxed for 3 hours.

The stirrer was started and the methanol was distilled off. The reaction mixture was cooled while stirring and the yellow crystalline reaction product which formed was recovered by filtration, washed with water and dried at 50° C. 14.4 grams of p-(di-β-hydroxyethyl)-benzylidenemalonitrile melting at 121° C.–123° C. were obtained.

Example 15

By the use of 22.85 grams of 4'-(di-β-hydroxyethylamino) - 2' - methylbenzalaniline-3-sulfonic acid in place of p-(di-β-hydroxyethylamino)-benzalaniline-m-sulfonic acid in Example 14 about 14.8 grams of

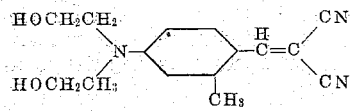

a yellow crystalline dye melting at 139° C.–140° C. is obtained.

Example 16

To a cold (0° C.–5° C.) solution of 135 grams of N,N-di-β-hydroxyethylaniline in 750 cc. of water and 95 cc. of concentrated hydrochloric (commercial) acid (sp. gr. 1.18) were added 65 cc. of commercial formaldehyde (35–40%). After standing for 24 hours at 5° C., 230 grams of sodium-m-nitrobenzenesulfonate trihydrate were added at 5° C. and then 1 liter of cold water (5° C.) was added. 465 cc. of concentrated hydrochloric acid (sp. gr. 1.18) and 200 grams of iron filings were gradually added during 5 hours, with stirring, while keeping the temperature below 10° C. The reaction mixture was filtered by gravity and the filtrate was kept at 5° C. for 24 hours. (In some cases a longer standing time may be desirable). The desired reaction product was filtered off by suction and washed with cold water until free of iron salts and dried at 45° C. 153 grams of p-(di-β-hydroxyethylamino)-benzalaniline-m-sulfonic acid having the formula:

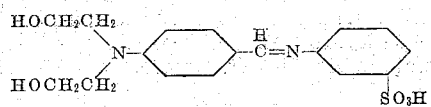

were recovered as bright yellow crystals.

Example 17

To a cold (0° C.–5° C.) solution of 145 grams of N,N-di-β-hydroxyethyl-m-toluidine in 750 cc. of water and 95 cc. of concentrated hydrochloric acid (commercial 35%, sp. gr. 1.18) were added 65 cc. of commercial formaldehyde (35–40%). After standing for 24 hours at 5° C., 230 grams of sodium-m-nitrobenzenesulfonate trihydrate were added at 5° C. and then 1 liter of cold water (5° C.) was added, 465 cc. of concentrated hydrochloric acid (commercial 35%, sp. gr. 1.18) and 200 grams of iron filings were gradually added during 5 hours with stirring. During this addition the temperature rose to about 20° C. during the first hour and was kept at 20° C. for the remaining 4 hours. The reaction mixture was stirred for an additional ½ hour. The stirrer was removed and the unreacted iron allowed to settle out during 10 minutes. The supernatant liquid or suspension was decanted (or siphoned) from the iron and allowed to stand for 24 hours at 5° C. (In some cases a longer standing time may be desirable.) The desired reaction product was filtered off by suction and washed with cold water until free of iron salts and dried at 50° C. 160 grams of 4'-(di-β-hydroxyethylamino)-2'-methylbenzalaniline-3-sulfonic acid having the formula:

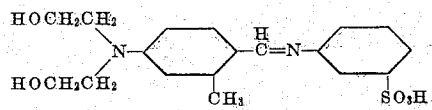

were recovered as bright yellow crystals.

Example 18.—Sodium-m-nitrobenzenesulfonate trihydrate 55 kilograms of 20% oleum were placed in a 17 gal. steel boiler plate can. The oleum was stirred and 12.3 kg. of nitrobenzene were added over a period of one hour while keeping the temperature between 20° C.–30° C. The reaction mixture was slowly heated to 65° C. over a period of 7–8 hours at the rate of about 5° per hour. The sulfonation is complete when a drop of the sulfonation mixture in water gives a clear solution and has no odor of nitrobenzene.

The reaction mixture was then cooled to 25° C.–30° C. and poured slowly with stirring onto about 35 kg. of crushed ice and 20 liters of water. The desired compound was salted out by stirring in about 20 kg. of salt. The grayish-white solid that separates was filtered on a Büchner funnel and washed with a cold salt solution of 10% strength until free of acid. Upon air drying 27.06 kg. of sodium-m-nitrobenzene trihydrate having the formula:

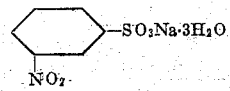

were obtained.

The new methine dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The methine dye compounds having the general formula:

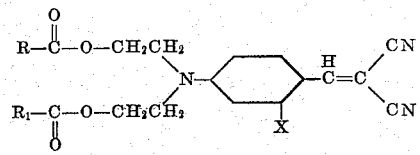

wherein R and R₁ each represents a member selected from the group consisting of a methyl group, an ethyl group, a propyl group, a CH₃—O—CH₂— group and a CH₃CH₂—O—CH₂— group and X represents a member selected from the group consisting of a hydrogen atom and a methyl group.

2. The methine dye compound having the formula:

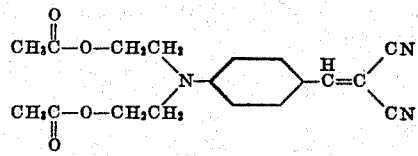

3. The methine dye compound having the formula:

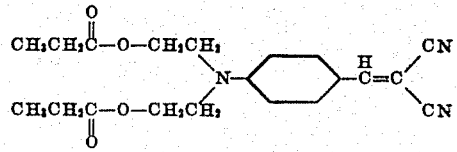

4. The methine dye compound having the formula:

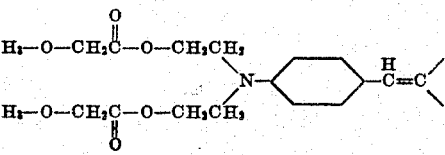

5. The methine dye compound having the formula:

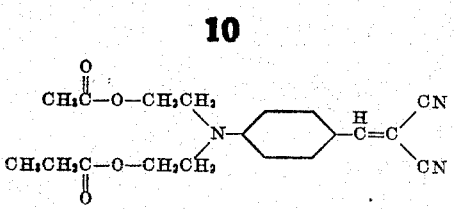

6. The methine dye compound having the formula:

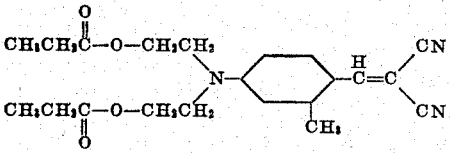

JOSEPH B. DICKEY.
GEORGE J. TAYLOR.

REFERENCES CITED

The following references are of record in the file of this patent:

UNITED STATES PATENTS

| Number | Name | Date |
|---|---|---|
| 2,043,081 | Wahl | June 2, 1936 |
| 2,206,108 | Muller | July 2, 1940 |

FOREIGN PATENTS

| Number | Country | Date |
|---|---|---|
| 194,193 | Switzerland | Feb. 16, 1935 |
| 808,268 | France | Feb. 2, 1937 |